United States Patent
Chakrapani et al.

(10) Patent No.: US 6,301,040 B1
(45) Date of Patent: Oct. 9, 2001

(54) SPD FILMS HAVING IMPROVED PROPERTIES AND LIGHT VALVES COMPRISING SAME

(75) Inventors: Srinivasan Chakrapani, Huntington; Steven M. Slovak, N. Massapequa, both of NY (US)

(73) Assignee: Research Frontiers Incorporated, Woodbury, NY (US)

(*) Notice: Subject to any disclaimer, the term of this patent is extended or adjusted under 35 U.S.C. 154(b) by 0 days.

(21) Appl. No.: 09/577,803

(22) Filed: May 24, 2000

(51) Int. Cl.[7] .................................................. G02B 26/00
(52) U.S. Cl. ......................... 359/296; 359/452; 359/253; 345/107; 356/441; 525/176
(58) Field of Search ...................................... 359/296, 253, 359/452; 345/105, 107, 108; 356/441; 525/176

(56) References Cited

U.S. PATENT DOCUMENTS

| | | | |
|---|---|---|---|
| 4,178,326 | * 12/1979 | Stevenson et al. | 525/176 |
| 4,273,422 | * 6/1981 | Saxe | 359/296 |
| 4,919,521 | * 4/1990 | Tada et al. | 359/296 |
| 5,103,336 | * 4/1992 | Sieloff | 359/253 |

* cited by examiner

Primary Examiner—Loha Ben
(74) Attorney, Agent, or Firm—Greenberg Traurig, LLP

(57) ABSTRACT

A film suitable for use as the light-modulating unit of a light valve, is disclosed. The film comprises a cross-linked polymer matrix having droplets of a liquid light valve suspension distributed in the cross-linked polymer matrix. The polymer matrix, prior to cross-linking, comprises a polymer having a Brookfield viscosity of at least 2000 CPs.

20 Claims, No Drawings

SPD FILMS HAVING IMPROVED PROPERTIES AND LIGHT VALVES COMPRISING SAME

FIELD OF INVENTION

The present invention relates to improved SPD films, and in particular to improvements in the matrix polymer used or useable for such films, and to light valves comprising such films.

BACKGROUND

Light valves have been known for over sixty years for modulation of light. As used herein, a light valve may be described as a cell formed of two walls that are spaced apart by a small distance, at least one wall being transparent, the walls having electrodes thereon usually in the form of transparent electrically conductive coatings. The cell contains a light-modulating element (sometimes herein referred to as an "activatable material"), which may be either a liquid suspension of particles or a plastic film in which droplets of a liquid suspension of particles are distributed.

The liquid suspension (sometimes herein referred to as "a liquid light valve suspension") comprises small particles suspended in a liquid suspending medium. In the absence of an applied electrical field, the particles in the liquid suspension assume random positions due to Brownian movement, and hence a beam of light passing into the cell is reflected, transmitted or absorbed, depending upon the cell structure, the nature and concentration of the particles and the energy content of the light. The light valve is thus relatively dark in the OFF state. However, when an electric field is applied through the liquid light valve suspension in the light valve, the particles become aligned and for many suspensions most of the light can pass through the cell. The light valve is thus relatively transparent in the ON state. Light valves of the type described herein are also known as "suspended particle devices" or "SPDs".

Light valves have been proposed for use in numerous applications including e.g., alphanumeric displays and television displays; filters for lamps, cameras, optical fibers and for displays; and windows, sunroofs, sunvisors, eyeglasses, goggles and mirrors and the like to control the amount of light passing therethrough or reflected therefrom as the case may be. Examples of windows, without limitation, include architectural windows for commercial buildings, greenhouses and residences, windows for automotive vehicles, boats, trains, planes and spacecraft, windows for doors including peepholes, and windows for appliances such as ovens and refrigerators including compartments thereof.

For many applications, it is preferable for the activatable material, i.e. the light modulating element, to be a plastic film rather than a liquid suspension. For example, in a light valve used as a variable light transmission window, a plastic film, in which droplets of liquid suspension are distributed, is preferable to a liquid suspension alone because hydrostatic pressure effects e.g., bulging associated with a high column of liquid suspension can be avoided through use of a film, and the risk of possible leakage can also be avoided. Another advantage of using a plastic film is that, in a plastic film, the particles are generally present only within very small droplets and, hence, do not noticeably agglomerate when the film is repeatedly activated with a voltage.

A "light valve film" as used herein refers to a film having droplets of a liquid suspension of particles distributed in the film or in part of the film.

Light valve films made by cross-linking emulsions are known. See U.S. Pat. Nos. 5,463,491, 5,463,492 and 5,728, 251 and U.S. patent application Ser. No. 08/941,599, now U.S. Pat No. 6,081,272, all of which are assigned to the assignee of the present invention. All of the above patents and patent applications and any other patents and references cited therein or elsewhere herein are incorporated into this application by reference thereto.

THE LIQUID LIGHT VALVE SUSPENSION

1. Liquid Suspending Media and Stabilizers.

A liquid light valve suspension may be any liquid light valve suspension known in the art and may be formulated according to techniques known to one skilled in the art. The term "liquid light valve suspension" as used herein means a "liquid suspending medium" in which a plurality of small particles are dispersed. The "liquid suspending medium" comprises one or more non-aqueous, electrically resistive liquids in which there is preferably dissolved at least one type of polymeric stabilizer which acts to reduce the tendency of the particles to agglomerate and to keep them dispersed and in suspension.

The liquid light valve suspension useful in the present invention may include any of the liquid suspending media previously proposed for use in light valves for suspending the particles. Liquid suspending media known in the art which are useful herein, include, but are not limited to the liquid suspending media disclosed in U.S. Pat. Nos. 4,247, 175 and 4,407,565. In general one or both of the liquid suspending medium or the polymeric stabilizer dissolved therein is chosen so as to maintain the suspended particles in gravitational equilibrium.

The polimeric stabilizer employed can be a single type of solid polymer that bonds to the surface of the particles but also dissolves in the non-aqueous liquid or liquids of the liquid suspending medium. Alternatively, there may be two or more solid polymeric stabilizers serving as a polymeric stabilizer system. For example, the particles can be coated with a first type of solid polymeric stabilizer such as nitrocellulose which, in effect, provides a plain surface coating for the particles and one or more additional types of solid polymeric stabilizer that bond to or associate with the first type of solid polymeric stabilizer and also dissolve in the liquid suspending medium to provide dispersion and steric protection for the particles. Also, liquid polymeric stabilizers may be used to advantage, especially in SPD light valve films, as described in U.S. Pat. No. 5,463,492.

2. Particles.

Inorganic and organic particles may be used in a light valve suspension, and such particles may be light-absorbing or light-reflecting in all or part of the visible portion of the electromagnetic spectrum.

Conventional SPD light valves have generally employed polyhalide particles of colloidal size. As used herein the term "colloidal" when referring to particle size shall mean that a particle has a largest dimension averaging 1 micron or less. Preferably, polyhalide or other types of particles used or intended for use in an SPD light valve suspension will have a largest dimension which is less than one-half of the wavelength of blue light i.e., 2000 Angstroms or less to keep light scatter extremely low.

PRIOR ART FILM PROBLEMS

Prior art cross-linkable SPD films, described below, have suffered from a variety of problems which have prevented the films from being mass produced commercially.

U.S. Pat. Nos. 5,463,491 and 5,463,492 describe cross-linked SPD films usually cured with heat. However, the length of time necessary to cure such a film with heat, often about 1 hour, is inconveniently long for industrial film-coating processes. By comparison, UV curing of coated films is often achieved industrially in several seconds, enabling a web carrying coated film to move at high speed. Also, in the case of the aforesaid two patents, in order to achieve a relatively uniform distribution of droplets in the cured matrix polymer, it was generally necessary either to use a separate emulsifier or to incorporate pendant ester groups on the matrix polymer to serve as an emulsifier, a so-called "cross-linkable emulsifier". Although effective, the cross-linkable emulsifier was difficult to synthesize, and did not have a long shelf life.

Ultraviolet coating of films is a well-established industrial technique. The first attempt to use ultraviolet radiation to cure an SPD film (see U.S. Pat. No. 5,463,491, Example 13) resulted in suspension being encapsulated within the matrix, but was not commercially viable because the liquid suspension in the droplets (capsules) had been severely degraded as evidenced by a color change from blue to red. Moreover, the time needed to cure the film with UV radiation, 10 minutes, was far too long to be commercially useful. In addition, a mismatch in the indices of refraction of the matrix and suspension in that instance caused unwanted haze.

Prior art SPD films generally require use of at least one difficult-to-synthesize monomer. An example of such a monomer is 1,4-bis (hydroxydimethylsilyl) benzene, referred to in Example 24 of U.S. Pat. No. 5,463,492. This monomer is not only difficult to make, but also very expensive.

Ultraviolet-curable films are described in U.S. patent application Ser. No. 08/941,599. Although such films can be rapidly cured without substantial color change, and can match the indices of refraction of the matrix and droplets, the films still exhibit undesired deficiencies. For example, the difficult to obtain monomer mentioned in the previous paragraph was still employed in the Patent Application (See Example 1). Also, it was still necessary to use either a cross-linkable emulsifier or a separate emulsifier in order to effect good droplet distribution in the matrix. Furthermore, the viscosity of the UV-cross-linkable siloxane copolymers made by the method of the above Patent Application were generally very low. For example, in Example 1 of that Patent Application a method of preparing such a copolymer having a viscosity of only 423 centipoises at 22.9° C. is set forth.

In order to achieve some shelf life for such a UV-cross-linkable polymer, end-capping is required. However, prior art polymeric synthesis, which used Bronsted Acid catalysts, caused gels, and required that end-capping be done at room temperature, rather than at higher temperature, in order to keep the molecular weight up, but the catalyst itself limited the peak molecular weight to less than about 10,000. Yields of only 55–65% were typical.

DESCRIPTION OF THE INVENTION

The present invention overcomes the numerous deficiencies of the prior art, and enables UV-cross-linkable polymers of moderately high viscosities to be repeatedly synthesized with similar properties.

Instead of 1, 4-bis (hydroxydimethylsilyl) benzene, a copolymer of silanol-terminated diphenyldialkyl siloxane is used. An example of such a material is a copolymer of silanol-terminated diphenyldimethyl siloxane which is purchased from U.C.T. Corporation (Rocky Hill, Conn.). In the examples below this copolymer (referred to as "copodisilanol") must be purified before use to remove cyclic siloxanes, by vacuum distillation at 180° C.

With respect to the copolymer of silanol-terminated diphenyldialkyl siloxane, the alkyls can be the same or different and are straight-chain or branched $C_1$–$C_4$ alkyls, preferably $C_1$–$C_3$ alkyls, most preferably, methyl. In the preparation of the siloxane copolymers with pendant phenyls used in this invention, it is contemplated that the comonomer can be a 3-(meth) acryloxy alkyl dialkoxyalkyl siloxane in which the alkoxy groups can be the same or different and can be straight-chain or branched $C_1$–$C_4$ alkoxy groups. The alkyl can be as defined hereinabove in regard to the alkyl dialkoxyalkyl siloxane. Additionally, the comonomer can be an alkyldialkoxy silane having a vinyl-containing or free radically polymerizable group or other groups such as a cationically polymerizable moiety, for example an epoxy or vinyl ether.

It is also contemplated that one of the silanol terminated materials useful in the present invention can also be an oligomer containing dihalo, preferably, dichloro end-groups, e.g., chlorine terminated polydimethyl-siloxanes. In the case of copodisilanol, the copolymer could also be an alkylphenyl-homopolymer (silanol terminated) of appropriate refractive index. The alkyl is defined previously, herein.

Moreover, surprisingly it has been discovered that the procedures of the present invention, by enabling relatively high viscosities to be made, can eliminate the need for either a separate emulsifier or for the cross-linkable emulsifier of the prior art if the viscosity of the matrix polymer is sufficiently high, preferably, a minimum of 2000 CPs Brookfield viscosity, more preferably, 6000 CPs viscosity and most preferably, a viscosity in the range of 8000–15000 CPs. This represents a major simplification and cost saving.

The use of Bronsted Acid catalysts has been eliminated. By using Lewis Acid catalyst instead, higher viscosities and molecular weights have been achieved, along with elimination of a neutralization procedure. Any Lewis Acid useful in catalyzing reactions such as the instant reactions can be employed.

Whereas shelf life of the prior art UV-cross-linkable copolymers averaged a few months before gelling usually occurred, the shelf life of the UV-cross-linkable copolymers of the present invention has been improved to more than 1 year, with no known upper limit.

Yields of 85% or more have been achieved, much higher than achieved by prior art procedures.

In general the matrix polymers of the present invention are also more clear and transparent than those of the prior art for cross-linkable SPD films.

In general, to form an emulsion suitable for curing, the procedure of U.S. Pat. No. 5,463,492 or U.S. patent application Ser. No. 08/941,599, now U.S. Pat No. 6,081,272, (both of which are expressly incorporated herein by reference thereto) is followed, i.e., the matrix polymer of the present invention is mixed vigorously with an immiscible liquid suspension whose liquid suspending medium may be a liquid suspending polymer. The emulsion is then spread on a suitable substrate e.g., an indium tin oxide ("ITO") coated sheet of either glass or plastic.

Provided that an exposed film face is not over cured so as to form a crust, SPD films employing the matrix polymers of the present invention are sufficiently tacky to exhibit good adhesion to a wide variety of substrates including, without limitation thereto, glass and plastic substrates and such substrates on which there is in contact with the film an electrode in the form of a coating of transparent electrically conductive material such as (ITO), tin oxide, or a low emissivity coating such as fluorine-doped tin oxide or an electrode overcoated with a dielectric layer. SPD films of the present invention also exhibit good cohesion.

Set forth below are the procedures for synthesizing three different viscosities of the siloxane copolymer of the present invention.

SYNTHESIS OF SILOXANE COPOLYMER WITH PENDANT PHENYLS 1. 31 grams of copodisilanol (purified, RI 1.4715@25° C.), 11.75 g of PDMS disilanol, 4.00 g of 3-acryloxypropyl dimethoxymethyl silane, 0.51 g of stannous 2-ethylhexanoate are weighed into a 500 mL round-bottom flask with 3-necks. 200 mL of heptane is added to the flask at ambient temperature. One neck of the flask is a port for the agitator shaft. Through the other necks, a thermometer and a 25 mL Dean-Stark trap (D-S) are attached. The D-S is filled with water up to the 20 mL of water mark. The contents of the flask are stirred for 10 minutes with mechanical agitation to give a nice mix. The contents of the flask are then heated to reflux for 5 hours. Reflux temperature is 101° C. Then, 14 mL of trimethylethoxy silane is introduced through the top of the condenser and refluxing continued for an additional 3 hours.

At the end of the end-capping reaction, contents of the flask are cooled and transferred into a 1 L beaker. The flask is washed with an additional 50 mL of heptane and the washings also are added to the beaker. To this agitated solution is added 166 mL of ethanol and 333 mL of methanol. Agitation is continued for 10 more minutes and the contents of the beaker transferred into a 2 L separatory funnel. Layer separation is allowed to proceed for at least a couple of hours. The bottom layer contains the polymer, which is recovered after rotary evaporation of solvent under reduced pressure at 80° C. The steps in this paragraph remove low molecular weight impurities and much of the catalyst.

The yield is 85.5%. The polymer had a Brookfield viscosity of 3540 CPs, and an RI value of 1.4526 (before passing the liquid polymer through a falling film distillation apparatus to remove volatile liquids). A repeat of this experiment resulted in a yield of 84.15%, a Brookfield viscosity of 3530 CPs with an RI of 1.4527. The two polymer samples were mixed and passed through the falling film distillation unit under vacuum at xylene reflux. The resulting polymer had an RI value of 1.4531, a Brookfield viscosity of 4550 and a peak mol. wt. of about 12,700.

The molecular weight values are based on a polydimethylsiloxane calibration and the peak molecular weight is from the number average molecular weight. Measurements of refractive index and viscosity values were done at 25° C.

2. 31 grams of copodisilanol (purified, RI 1.4715@25° C.), 11.75 g of PDMS disilanol, 4.00 g of 3-acryloxypropyl dimethoxymethyl silane, 0.6 g of stannous 2-ethylhexanoate are weighed into a 500 mL round-bottom flask with 3 necks. 200 mL of heptane is added to the flask at ambient temperature. One neck of the flask is a port for the agitator shaft. Through the other necks, a thermometer and a 25 mL Dean-Stark trap (D-S) are attached. The D-S trap is filled with water up to the 20 mL of water mark. The contents of the flask are stirred for 10 minutes with mechanical agitation to give a nice mix. The contents of the flask are then heated to reflux for 5 hours. Reflux temperature is at 101° C. Then, 14 mL of trimethylethoxy silane is introduced through the top of the condenser and refluxing continued for an additional 3 hours.

At the end of the end-capping reaction, contents of the flask are cooled and transferred into a 1 L beaker. The flask is washed with an additional 50 mL of heptane and the washings also are added to the beaker. To this agitated solution is added 166 mL of ethanol and 333 mL of methanol. Agitation is continued for 10 more minutes and the contents of the beaker transferred into a 2 L separatory funnel. Layer separation is allowed to proceed for at least a couple of hours. The bottom layer contains the polymer, which is recovered after rotary evaporation of solvent under reduced pressure at 80° C. The steps in this paragraph remove low molecular weight impurities and much of the catalyst.

The yield is 87.7%, with a Brookfield viscosity of 6,680 CPs and on RI value 1.4526 (before passing the liquid polymer through a falling film distillation apparatus to remove volatile liquids). A repeat of this experiment resulted in a yield of 89.9%, a Brookfield viscosity of 5760 CPs with an RI of 1.4526. These two polymers were combined and passed through the falling film distillation unit under vacuum at xylene reflux. The resulting polymer had an RI value of 1.4534, a Brookfield viscosity of 8630 CPs and a peak molecular weight of about 16,600.

The molecular weight values mentioned are based on a polydimethylsiloxane calibration and the number average values were used for the peak molecular weight. Measurements of refractive index and viscosity values were done at 25° C.

3. 31 grams of copodidiland (purified, RI 1.4715@25° C.), 11.75 g of PDMS disilanol, 4.00 g of 3-acryloxypropyl dimethoxymethyl silane, 0.75 g of stannous 2-ethylhexanoate are weighed into a 500 mL round-bottom flask with 3-necks. 200 mL of heptane is added to the flask at ambient temperature. One neck of the flask is a port for the agitator shaft. Through the other necks, a thermometer and a 25 mL Dean-Stark trap (D-S) are attached. The D-S trap is filled with water up to the 20 mL of water mark. The contents of the flask are stirred for 10 minutes with mechanical agitation to give a nice mix. The contents of the flask are then heated to reflux for 5 hours. Reflux temperature is at 101° C. Then, 14 mL of trimethylethoxy silane is introduced through the top of the condenser and refluxing continued for an additional 3 hours.

At the end of the end-capping reaction, contents of the flask are cooled and transferred into a 1 L beaker. The flask is washed with an additional 50 mL of heptane and the washings also are added to the beaker. To this agitated solution is added 166 mL of ethanol and 333 mL of methanol. Agitation is continued for 10 more minutes and the contents of the beaker transferred into a 2 L separatory funnel. Layer separation is allowed to proceed for at least a couple of hours. The bottom layer contains the polymer, which is recovered after rotary evaporation of solvent under reduced pressure at 80° C. The steps in this paragraph remove low molecular weight impurities and much of the catalyst.

The yield is 90.7%, a Brookfield viscosity of 11,820 CPs and on RI value 1.4529 (before passing the liquid polymer through a falling film apparatus to remove volatile liquids). A repeat of this experiment resulted in a yield of 89.7%, a Brookfield viscosity of 13,480 CPs with an RI of 1.4528. The two polymer samples were mixed and passed through the falling film distillation unit under vacuum at xylene reflux. The resulting polymer had an RI value of 1.4535, a Brookfield viscosity of 20,570 CPs and a peak mol. wt. of about 26,300.

It must be noted that the molecular weight mentioned is based on a polydimethysiloxane calibration and the number average molecular weight was used at the peak molecular weight. Measurements of refractive index and viscosity values were done at 25° C.

The particles and other materials comprised by the liquid light valve suspension of this invention such as, without limitation thereto, polymers and the liquid suspending medium, should all be compatible with one another and not degrade one another. Moreover, the SPD films of the present invention can be easily cured with either ultraviolet radiation or electron beams without significant degradation.

What is claimed is:

1. A film suitable for use as the light-modulating unit of a light valve, comprising a cross-linked polymer matrix having droplets of a liquid light valve suspension distributed in the cross-linked polymer matrix, wherein said film is substantially undamaged due to cross-linking and wherein the polymer matrix, prior to cross-linking, comprises a polymer having a Brookfield viscosity of at least 2000 CPs.

2. The film according to claim 1, wherein said polymeric matrix comprises a polymer having a Brookfield viscosity of at least 6000 CPs.

3. The film according to claim 2, wherein said polymeric matrix comprises a polymer having a Brookfield viscosity of between about 8000–15,000 CPs.

4. The film according to claim 1, wherein said polymeric matrix comprises a copolymer of silanol-terminated diphenyldialkyl siloxane.

5. The film according to claim 1, wherein the polymer comprises a comonomer which is a 3-(meth) acryloxy alkyl dialkoxyalkyl silane or an alkyldialkoxy silane having a vinyl-containing or a free radically or a cationically polymerizable group.

6. The film according to claim 1, wherein the polymer is derived from at least one copodisilanol.

7. The film of claim 6, wherein the at least one copodisilanol is an oligomer containing dihalo end groups.

8. The film of claim 6, wherein the at least one copodisilanol is a diphenyldialkyl siloxane or an alkyphenyl silanol terminated homopolymer of appropriate refractive index.

9. An SPD film formed by curing an emulsion comprising a matrix polymer and a liquid suspension of colloidal particles wherein said matrix polymer comprises a polymer according to claim 2.

10. An SPD film formed by curing an emulsion comprising a matrix polymer and a liquid suspension of colloidal particles wherein said matrix polymer comprises a polymer according to claim 3.

11. An SPD film formed by curing an emulsion comprising a matrix polymer and a liquid suspension of colloidal particles wherein said matrix polymer comprises a copolymer according to claim 4.

12. An SPD film formed by curing an emulsion comprising a matrix polymer and a liquid suspension of colloidal particles wherein said matrix polymer comprises a comonomer according to claim 5.

13. An SPD film formed by curing an emulsion comprising a matrix polymer and a liquid suspension of colloidal particles wherein said matrix polymer comprises a polymer according to claim 6.

14. An SPD film formed by curing an emulsion comprising a matrix polymer and a liquid suspension of colloidal particles wherein the at least one copodisilanol is an oligomer according to claim 7.

15. An SPD film formed by curing an emulsion comprising a matrix polymer and a liquid suspension of colloidal particles wherein the at least one copodisilanol is a diphenyldialkyl siloxane or an alkyphenyl silanol terminated homopolymer of appropriate refractive index according to claim 8.

16. In a light valve having opposed cell walls, the improvement wherein the film according to any one of claims 1 to 8 is between said cell walls as the light-modulating unit of the light valve.

17. A film suitable for use as the light-modulating unit of a light valve, comprising a cross-linked polymer matrix in the form of a film having droplets of a liquid light valve suspension distributed in the cross-linked polymer matrix, said liquid light valve suspension comprising particles suspended in a liquid suspending medium wherein the film is the film of any one of claims 1 to 8.

18. An SPD film formed by curing an emulsion comprising a matrix polymer and a liquid suspension of colloidal particles wherein said matrix polymer comprises a polymer according to claim 1.

19. An SPD film formed by curing an emulsion comprising a matrix polymer and a liquid suspension of colloidal particles wherein the film according to any one of claims 1 to 8 is between said cell walls as the light-modulating unit of the light valve.

20. The SPD film of any one of claims 12–15 wherein the film is cured by ultraviolet radiation or an electron beam.

* * * * *